United States Patent
Nakamura et al.

(10) Patent No.: US 7,612,797 B2
(45) Date of Patent: Nov. 3, 2009

(54) VEHICLE DISPLAY APPARATUS FOR DISPLAYING INFORMATION OF A FORWARD VIEW OF THE VEHICLE

(75) Inventors: Go Nakamura, Shizuoka (JP); Kouji Ishii, Shizuoka (JP); Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 699 days.

(21) Appl. No.: 11/347,368

(22) Filed: Feb. 6, 2006

(65) Prior Publication Data

US 2006/0176210 A1 Aug. 10, 2006

(30) Foreign Application Priority Data

Feb. 7, 2005 (JP) ............... 2005-030056

(51) Int. Cl.
*H04N 7/18* (2006.01)
*G06K 9/00* (2006.01)
(52) U.S. Cl. ...................... 348/148; 382/104
(58) Field of Classification Search ................ 348/148, 348/552, 118–119; 382/104; 340/903
See application file for complete search history.

(56) References Cited

U.S. PATENT DOCUMENTS

| | | | | |
|---|---|---|---|---|
| 5,555,312 A | * | 9/1996 | Shima et al. ................. | 382/104 |
| 5,922,036 A | * | 7/1999 | Yasui et al. ................... | 701/28 |
| 5,949,412 A | * | 9/1999 | Huntsman .................... | 715/740 |
| 5,991,427 A | * | 11/1999 | Kakinami et al. ........... | 382/104 |
| 6,547,425 B2 | | 4/2003 | Nishimura ................... | 362/466 |
| 6,819,779 B1 | * | 11/2004 | Nichani ....................... | 382/104 |
| 7,139,412 B2 | * | 11/2006 | Kato et al. ................... | 382/104 |
| 7,209,031 B2 | * | 4/2007 | Nakai et al. ................. | 340/435 |
| 7,379,815 B2 | * | 5/2008 | Kobayashi et al. .......... | 701/300 |
| 2002/0017985 A1 | * | 2/2002 | Schofield et al. ............ | 340/436 |
| 2004/0136568 A1 | | 7/2004 | Milgram et al. ............. | 382/104 |

FOREIGN PATENT DOCUMENTS

| | | |
|---|---|---|
| DE | 197 36 774 | 2/1999 |
| DE | 102 03 413 | 8/2003 |
| EP | 1 437 259 | 7/2004 |
| JP | 2003-237411 | 8/2003 |

* cited by examiner

*Primary Examiner*—Paulos M Natnael
(74) *Attorney, Agent, or Firm*—Kratz, Quintos & Hanson, LLP (57) ABSTRACT

The present invention is to provide a vehicle display apparatus having a clear view. When a vehicle runs on a flat road, a standard FOE (focus of expansion) is set so as that a horizon line is positioned at a central portion of a display area. When the vehicle approaches to an uphill road, the display area is moved to match ordinates of between a current FOE and the standard FOE. When the vehicle approaches to a downhill road, the display area is moved to match the ordinates of between the current FOE and standard FOE.

7 Claims, 9 Drawing Sheets

VEHICLE DISPLAY APPARATUS FOR DISPLAYING INFORMATION OF A FORWARD VIEW OF THE VEHICLE

BACKGROUND OF THE INVENTION

1. Field of the Invention

The present invention relates to a vehicle display apparatus, more specifically to a vehicle display apparatus to display an image information corresponding to a forward view of a vehicle.

2. Description of the Related Art

Figure 15A:
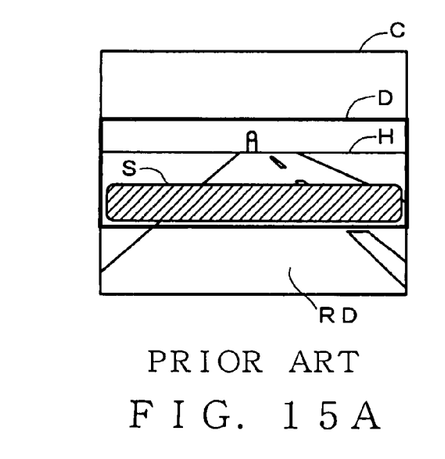
FIG. 15A is a drawing to illustrate problems of a conventional vehicle display apparatus.
Figure 15B:
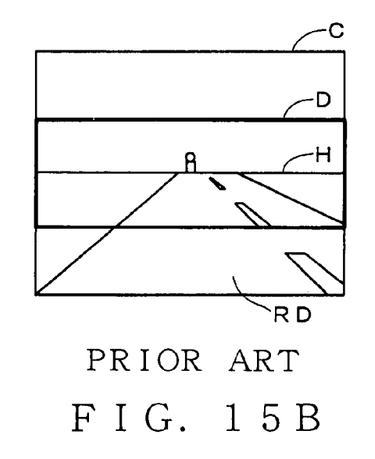
FIG. 15B is a drawing to illustrate the problems of the conventional vehicle display apparatus.
Figure 15C:
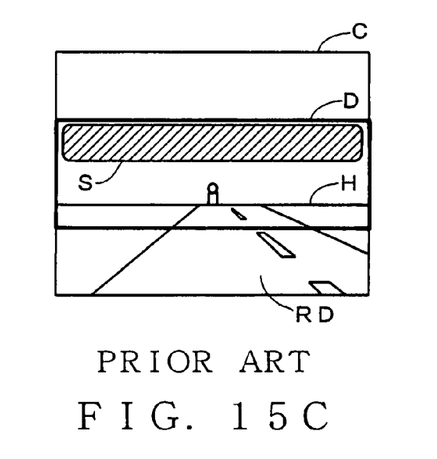
FIG. 15C is a drawing to illustrate the problems of the conventional vehicle display apparatus.

JP,2003-237411,A discloses a vehicle display apparatus having an image data acquisition device to take a forward image of a vehicle and a display device to display the image data on a prescribed area, in order to ensure a clear view. FIGS. 15A, 15B and 15C are drawings to illustrate problems of the conventional vehicle display apparatus.

The conventional image data acquisition device acquires an image information C and the display device has a display area D. A position of the display area D is fixed with respect to the image information C. For example, as shown in FIG. 15A, the display area D is always positioned to a central area of the acquired image information C.

In the conventional display apparatus, when the vehicle runs on a flat road RD, a horizon line H is set in a central portion of the display area D as shown in FIG. 15B. When the vehicle approaches to an uphill road RD, the horizon line H moves upward in the display area D as shown in FIG. 15A. When the vehicle approaches a downhill road RD, the horizon line H moves downward in the display area D as shown in FIG. 15C.

As shown FIGS. 15A-15C, the horizon line H moves up and down in the display area D depending on the up and down hills of the road RD. Accordingly, objects such as the horizon line H and the road D appeared in the display area D also move up and down, and reduces a clear view.

In order to always display the objects, such as the horizon line H and the road RD, irrespective of the up and down hills, it is necessary to have a wide display area D resulting to a large display device.

As shown in FIGS. 15A and 15C, when the vehicle approaches to the uphill or downhill, the display area D has an ineffective area S, which is denoted as diagonal lines, at an lower or upper portion of the display area D, respectively. The ineffective space S limits the appearance of the objects, such as the horizon line H and the road RD.

SUMMARY OF THE INVENTION

The present invention is to provide a vehicle display apparatus having a clear view when a vehicle approaches to an up or down hill road and a small size thereof with the clear view.

According to a first aspect of the present invention, a vehicle display apparatus includes: a camera to take an image information of a forward direction of a vehicle; a display device to display the image information to a display area; and a processing device, wherein the processing device has the processing steps of: extracting a current focus of expansion (FOE) from the image information for a display control; matching both ordinates of between the current FOE and a standard FOE, the standard FOE being fixed preliminarily at a predetermined portion of the display area; and displaying the image information to the display area.

Preferably, the processing step of extracting the current FOE has the steps of: extracting white lines of both sides of a road from the image information; calculating two straight lines corresponding to the white lines; calculating the current FOE from a intersection of the two straight lines; matching both ordinates of between the current FOE and the standard FOE; and displaying the image information to the display area.

Preferably, the standard FOE is positioned in the display area so as that a horizon line is displayed at a middle portion of the display area.

According to a second aspect of the present invention, a vehicle display apparatus includes: a camera to take an image information of a forward direction of a vehicle; a display device to display the image information to a display area; a near-infrared camera to take reflection spectra of the forward direction of the vehicle; and a processing device, wherein the processing device has the processing steps of: extracting a current horizon line from the reflection spectra for a display control; matching both ordinates of between the current horizon line and a standard horizon line, the standard horizon line being preliminarily fixed at a predetermined portion of the display area; and displaying the image information to the display area.

Preferably, the processing step of extracting the current horizon line has the steps of: extracting the current horizon line from the reflection spectra; matching both ordinates of between the current horizon line and the standard horizon line; and displaying the image information to the display area.

Preferably, the standard horizon line is positioned in a middle portion of the display area.

According to a third aspect of the present invention, a vehicle display apparatus includes: a camera to take an image information in a camera field of a forward direction of a vehicle; a display device to display the image information to a display area; a Global Positioning System (GPS) to determine a position and a moving direction of the vehicle; a tilt sensor to determine a tilt angle between the moving direction and a level line; and a processing device, wherein the processing device has the processing steps of: extracting map data corresponding to each position of the vehicle from a memory device; determining a highest visible position in the camera field at a current position of the vehicle from altitudes corresponding to the tilt angle in the map data; determining a highest visible position angle of between the highest visible position and a standard plane; matching both ordinates of between the highest visible position in the image information and a camera level line by an angle difference between the highest visible position angle and the tilt angle; and displaying the image information to the display area.

DETAILED DESCRIPTION OF THE PREFERRED EMBODIMENTS

Figure 1:
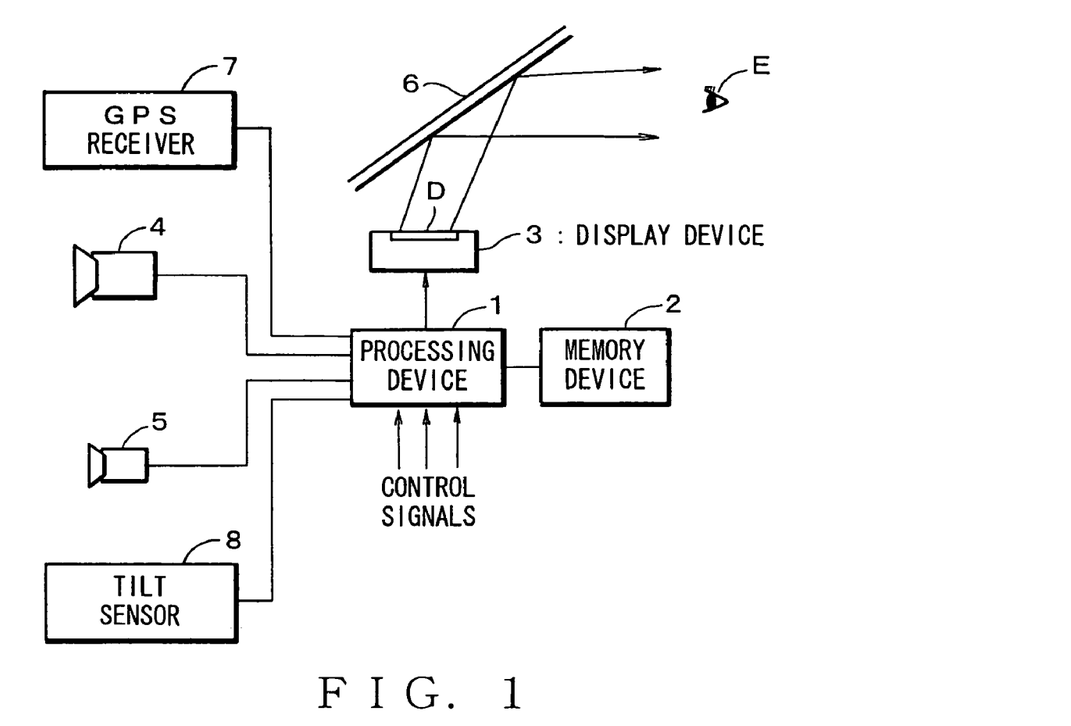
FIG. 1 is a block diagram showing a fundamental structure of a vehicle display apparatus of embodiments of the present invention.

An embodiment of the present invention is explained by referring to drawings. FIG. 1 is a block diagram of a vehicle display apparatus. As shown in FIG. 1, the vehicle display apparatus includes a processing device 1, a memory device 2, a display device 3, a camera 4 to take an image of a forward view of a vehicle, a near-infrared camera 5, a GPS receiver 7, and a tilt sensor 8. In order to improve the view at night, an image information emitted from the display device 3 is reflected with a window glass 6 toward eyes E as a head-up display for night vision.

The processing device 1 is a microcomputer having CPU, ROM, and RAM. The processing device 1 makes several arithmetic operations and controls the vehicle display apparatus. The processing device 1 drives and controls the camera 4 and the near-infrared camera 5 responding to several control signals from operations of light switches. The processing device 1 displays the image information to the display device 3 according to process flows described later.

The memory device 2, such as EEPROM, stores preliminarily a standard FOE (focus of expansion) for a first embodiment, standard reflection spectra and a standard horizon line for a second embodiment, and map data including an altitude of each position for a third embodiment, respectively.

Figures 4A, 4B:
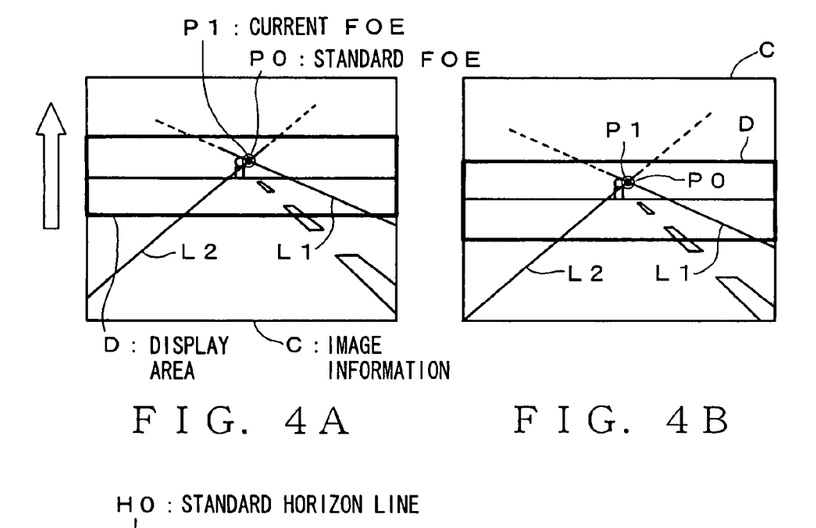
FIG. 4A is a drawing to illustrate a function of the first embodiment.
FIG. 4B is a drawing to illustrate the function of the first embodiment.
Figure 4C:
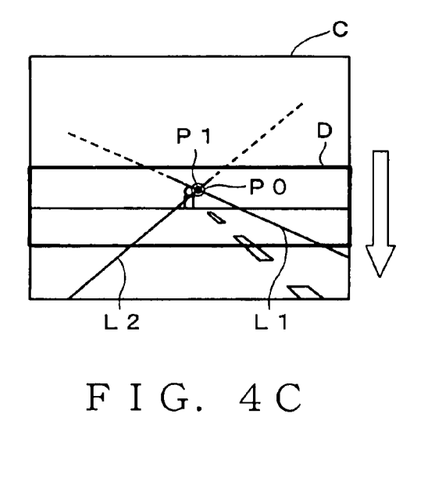
FIG. 4C is a drawing to illustrate the function of the first embodiment.
Figure 6:
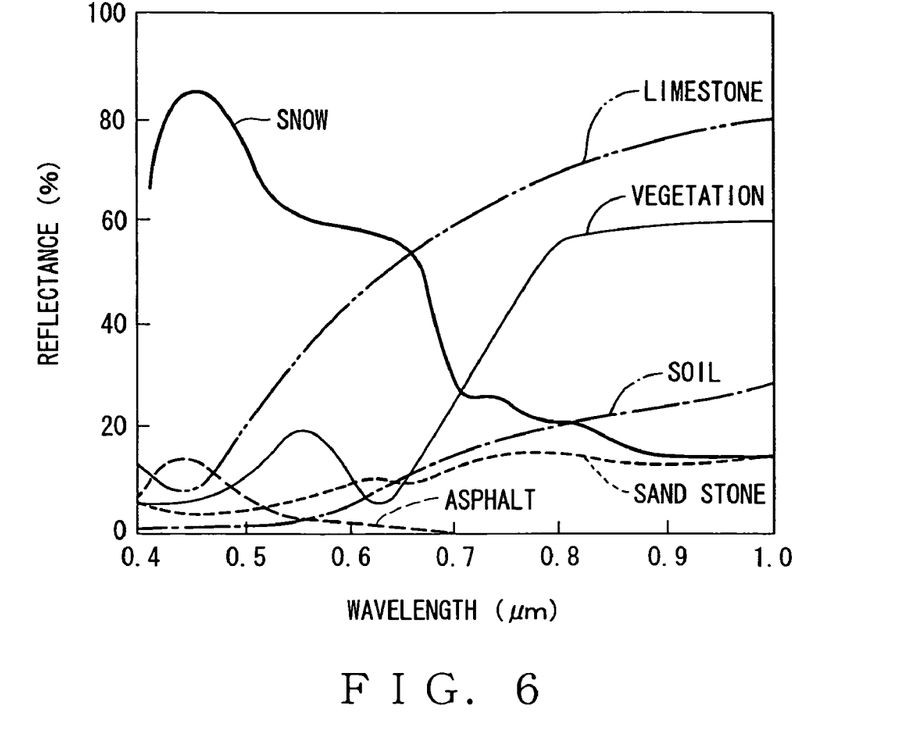
FIG. 6 shows examples of reflection spectra utilized at the second embodiment.
Figure 8A:
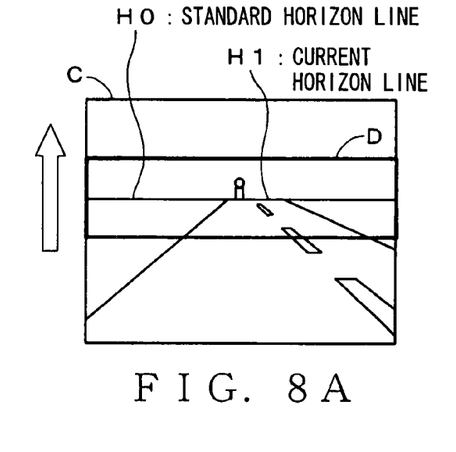
FIG. 8A is a drawing to illustrate a function of the second embodiment.
Figure 8B:
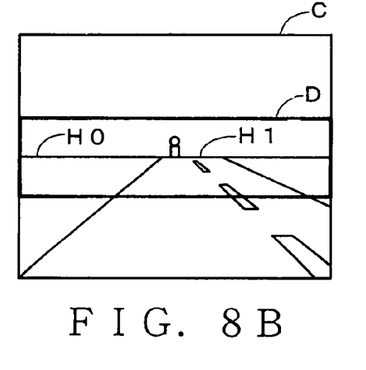
FIG. 8B is a drawing to illustrate the function of the second embodiment.
Figure 8C:
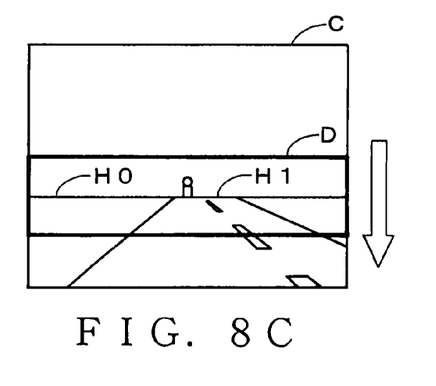
FIG. 8C is a drawing to illustrate the function of the second embodiment.

As shown in FIGS. 4A-4C, a standard FOE (focus of expansion) P0 is fixedly positioned in a predetermined position in a display area D. It is desirable to position the standard FOE P0 so as that a horizon line is located at a middle portion of the display area D in a vertical axis. A standard reflection spectrum is a reflection pattern of asphalt of a road as given in FIG. 6. As shown in FIG. 6, the reflection spectrum of the asphalt evidently differs from those of snow, limestone, vegetation, soil, and sand stone. This difference makes possible to distinguish the road from others. As shown in FIGS. 8A-8C, a standard horizon line H0 is fixedly positioned at a middle portion of the display area D in a vertical direction and becomes a standard line when the image information is displayed. When the vehicle runs on a flat road, the standard horizon line H0 and standard FOE P0 coincide with a current horizon line H1 and current FOE P1, respectively.

The display device 3 is, for example, an LCD (liquid crystal display) device and displays the image information of the forward direction of the vehicle to the display area D.

The camera 4 takes an image of the forward view of the vehicle illuminated by lights (not shown) and inputs the image information to the processing device 1. In order to obtain a clear view at night, the lights emit infrared light and the reflected image is taken by the camera 4.

The near-infrared camera 5 takes a reflected light from a forward spot illuminated by other light (not shown) and inputs informations to the processing device 1 for calculating reflected light spectra. The near-infrared camera 5 is not required for the first and third embodiments but is essential for the second embodiment.

The GPS receiver 7 receives GPS signals from a plurality of Global Positioning Systems (GPS) satellites and provides a current position of the vehicle. The tilt sensor 8 is, for example, a gyro or acceleration sensor to measure a tilt angle between a moving direction of the vehicle and a reference plane (level line). The GPS receiver 7 and tilt sensor 8 are essential to the third embodiment but are not required for the first and second embodiments.

Figures 14A, 14B:
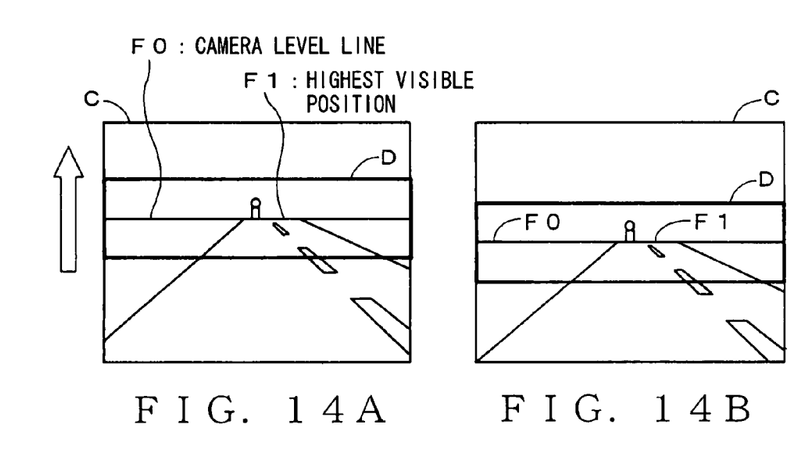
FIG. 14A is a drawing to illustrate a function of the third embodiment.
FIG. 14B is a drawing to illustrate the function of the third embodiment.
Figure 14C:
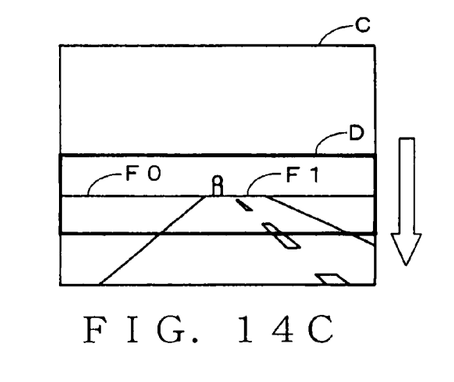
FIG. 14C is a drawing to illustrate the function of the third embodiment.

In FIGS. 4, 8 and 14 of the specification, an ordinate (Y-coordinate) means an upper and lower directions and an abscissa (X-axis) means right and left directions, respectively.

The image taken by the camera 4 or near-infrared camera 5 is input to the processing device 1. The processing device 1 calculates the image by referring to data in the memory device 2 to display a reversed image information in the display area D and emits the reversed image information from the display device 3. The emitted image information is reflected and reversed with the window glass 6 to the eyes E. Accordingly, the clear sight at night is given to a driver.

Figure 2:
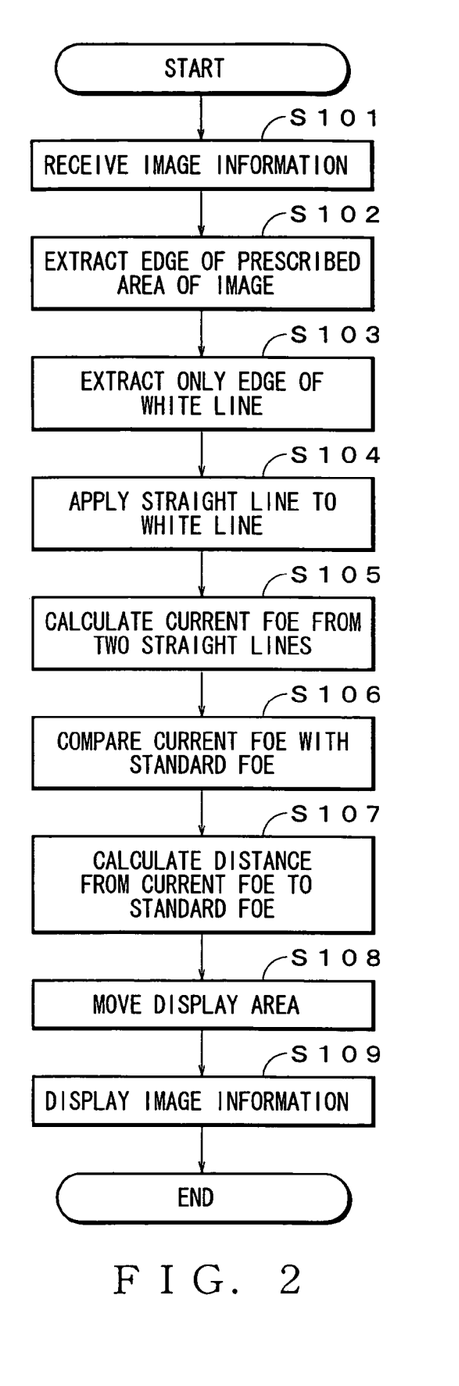
FIG. 2 is a flow chart showing a processing order of a first embodiment of the present invention.
Figure 3A:
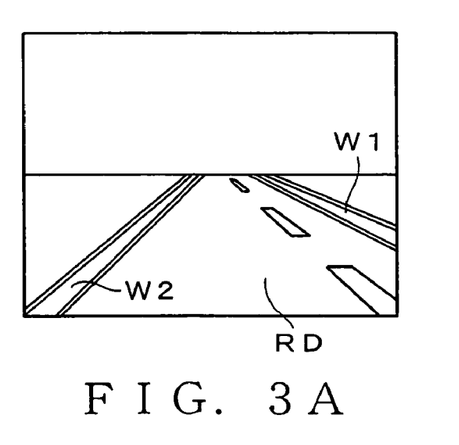
FIG. 3A is a drawing to illustrate a current FOE (focus of expansion) of the first embodiment.
Figure 3B:
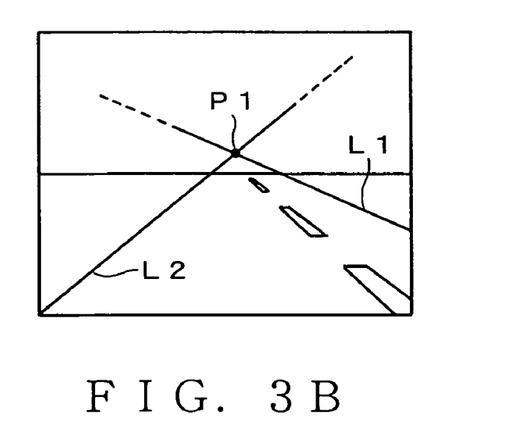
FIG. 3B is a drawing to illustrate the current FOE (focus of expansion) of the first embodiment.

A process flow of the first embodiment of the present invention is shown in FIG. 2 and referred to FIGS. 3 and 4. FIG. 2 is a flow chart of a processing order of the first embodiment of the present invention. FIGS. 3A and 3B are drawings to illustrate the current FOE P1 according to the first embodiment. FIGS. 4A-4C are drawings to illustrate a function of the first embodiment.

At step S101, the processing device 1 receives the image information corresponding to the spot taken by the camera 4. At step S102, the processing device 1 extracts an edge of a prescribed area, for example, a lower third of the image. The edge can be extracted with a known differential process. At step S103, the processing device 1 only extracts edges of white lines W1 and W2 at both sides of the road RD as shown in FIG. 3A. The edges of the white lines W1 and W2 can be extracted with the known Hough transformation with respect to all edges extracted at step S102.

At step S104, the processing device 1 applies two straight lines L1 and L2 for the white lines W1 and W2 respectively, as shown in FIG. 3B. The two straight lines L1 and L2 can be obtained by a known least square method from the white lines W1 and W2. At step S105, the processing device 1 calculates the current FOE P1 from an intersection between the lines L1 and L2, as shown in FIG. 3B.

At step S106, the processing device 1 compares the current FOE P1 with the standard FOF P0. At step S107, the processing device 1 calculates a distance from the current FOE P1 to the standard FOE P0. The distance corresponds to a difference between the current and standard FOE P1 and P0 in the ordinate.

At step S108, the processing device 1 moves the display area D by the calculated distance. The vehicle runs on a flat road and it is supposed that the horizon line is positioned at a central portion of the display area D as shown in FIG. 4B. When the vehicle approaches to an uphill road RD, the processing device 1 moves the display area D to a direction of an arrow indicated in FIG. 4A and matches the ordinates of between the current FOE P1 and standard FOE P0. When the vehicle approaches to a downhill road RD, the processing device 1 moves the display area D to a direction of an arrow indicated in FIG. 4C and matches the ordinates of between the current FOE P1 and standard FOE P0. In the embodiment, the image information C is fixed and the display area D is moved, and vice versa. Both can be moved. In other words, positions of the display area D and image information C are controlled so as that the ordinates of between the current FOE P1 and standard FOE P0 are matched together.

At step S109, the processing device 1 displays the image information C inside the display area D to the display device 3. The image displayed at the display device 3 is reversed from the image of the display area D of FIGS. 4A-4C.

According to the first embodiment of the present invention, the ordinates of between the current FOE P1 and standard FOE P0 are matched together on the image information C inside the display area D. Thereby, when the vehicle runs up-and-down hills, the objects such as the horizon line do not move up and down so that a clear view is assured. The standard FOE P0 is positioned so as to locate the horizon line to the middle portion of the ordinate of the display area D. Then, the display area D is effectively utilized. Thereby, the display device 3 can be smaller. Since the display area D only shows the effective informations so that the clear view is attained.

Figure 5:
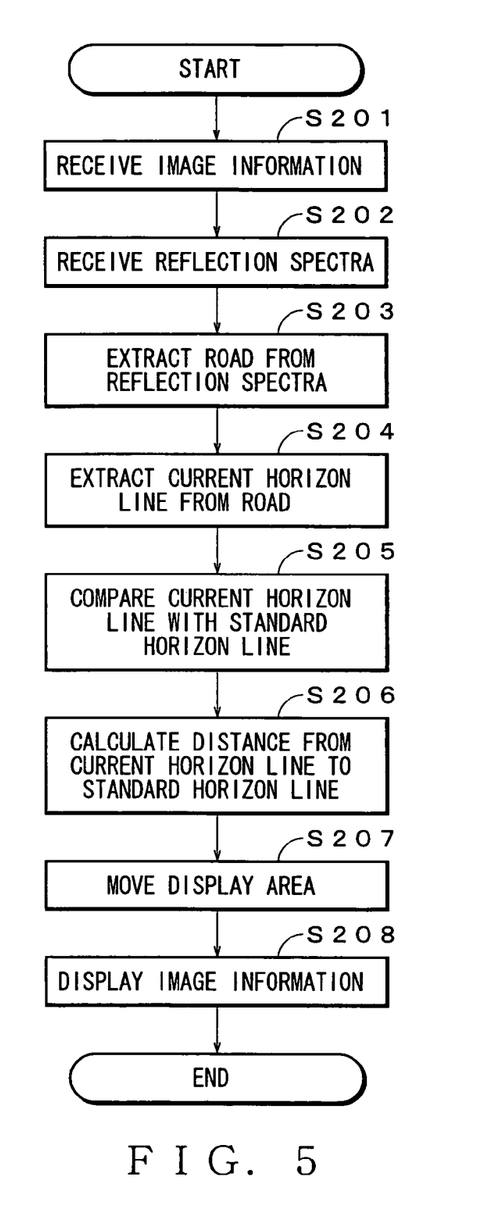
FIG. 5 is a flow chart showing a processing order of a second embodiment of the present invention.
Figure 7:
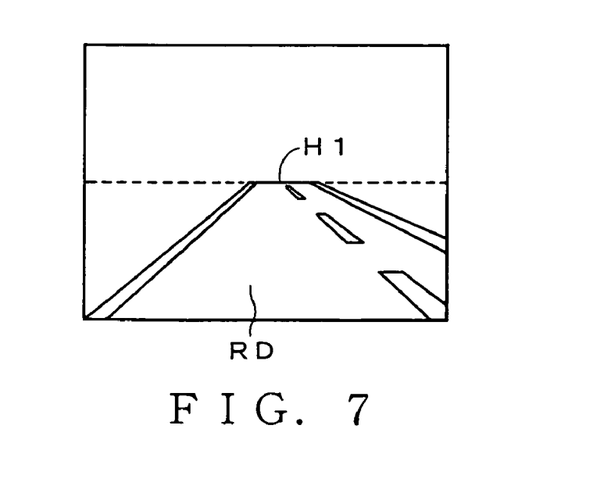
FIG. 7 is a drawing to illustrate a current horizon line according to the second embodiment.

FIG. 5 is a flow chart showing a processing order of a second embodiment of the present invention. FIG. 6 shows reflection spectra utilized in the second embodiment. FIG. 7 is a drawing to explain a current horizontal line H1. FIGS. 8A-8C are drawings to illustrate a function according to the second embodiment.

At step S201, a processing device 1 receives an image information of a forward direction of a vehicle. The image information corresponds to a spot information taken by the camera 4. At step S202, the processing device 1 receives reflection spectra, which can be obtained by the near-infrared camera 5 arranged at a front side of the vehicle.

At step S203, the processing device 1 extracts a road from the reflection spectra. The asphalt road RD as shown in FIG. 7 is extracted by comparing the received reflection spectra at step S201 with the standard reflection spectra stored beforehand in a memory device 2. At step S204, the processing device 1 extracts the current horizon line H1 from the extracted road RD. As shown in FIG. 7, the horizon line H1 corresponds to an upper end of the road RD.

At step S205, the processing device 1 compares the current horizon line H1 with the standard horizon line H0. At step S206, the processing device 1 calculates a distance from the current horizon line H1 to the standard horizon line H0.

At step S207, the processing device 1 moves the display area D by the calculated distance. The vehicle runs on a flat road RD and it is supposed that the horizon line H0 is positioned at a central portion of the display area D as shown in FIG. 8B. When the vehicle approaches to an uphill road RD, the processing device 1 moves the display area D to a direction of an arrow indicated in FIG. 8A and matches the ordinates of between the current horizon line H1 and standard horizon line H0. When the vehicle approaches to a downhill road RD, the processing device 1 moves the display area D to a direction of an arrow indicated in FIG. 8C and matches the ordinates of between the current horizon line H1 and standard horizon line H0. In the embodiment, the image information C is fixed and the display area D is moved, and vice versa. Both can be moved.

At step S208, the processing device 1 displays the image information C inside the display area D to the display device 3. The image displayed at the display device 3 is reversed from the image of the display area D of FIGS. 8A-8C.

In the embodiment (the flow chart of FIG. 5 and FIGS. 8A-8C), the standard and current horizon lines H0 and H1 are combined and matched together on the image information C. It is not necessary to combine the two horizon lines H0 and H1 on the image information C.

According to the second embodiment of the present invention, both the current horizon line H1 and standard horizon line H0 are matched together on the image information C inside the display area D. Thereby, when the vehicle runs up-and-down hills, the objects such as the horizon line do not move up and down so that a clear view is assured. The standard horizon line H0 is positioned at a middle portion of the ordinate of the display area D. Then, the display area D is effectively utilized. Thereby, the display device 3 can be smaller. Since the display area D only shows the effective informations so that the clear view is attained.

Figure 9:
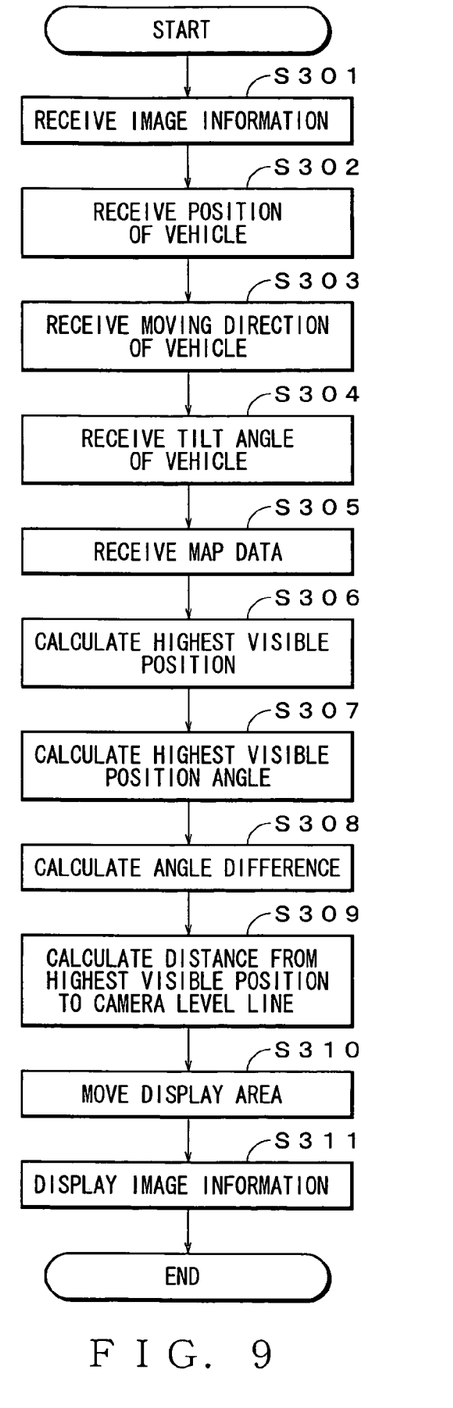
FIG. 9 is a flow chart showing a processing order of a third embodiment of the present invention.
Figure 10:
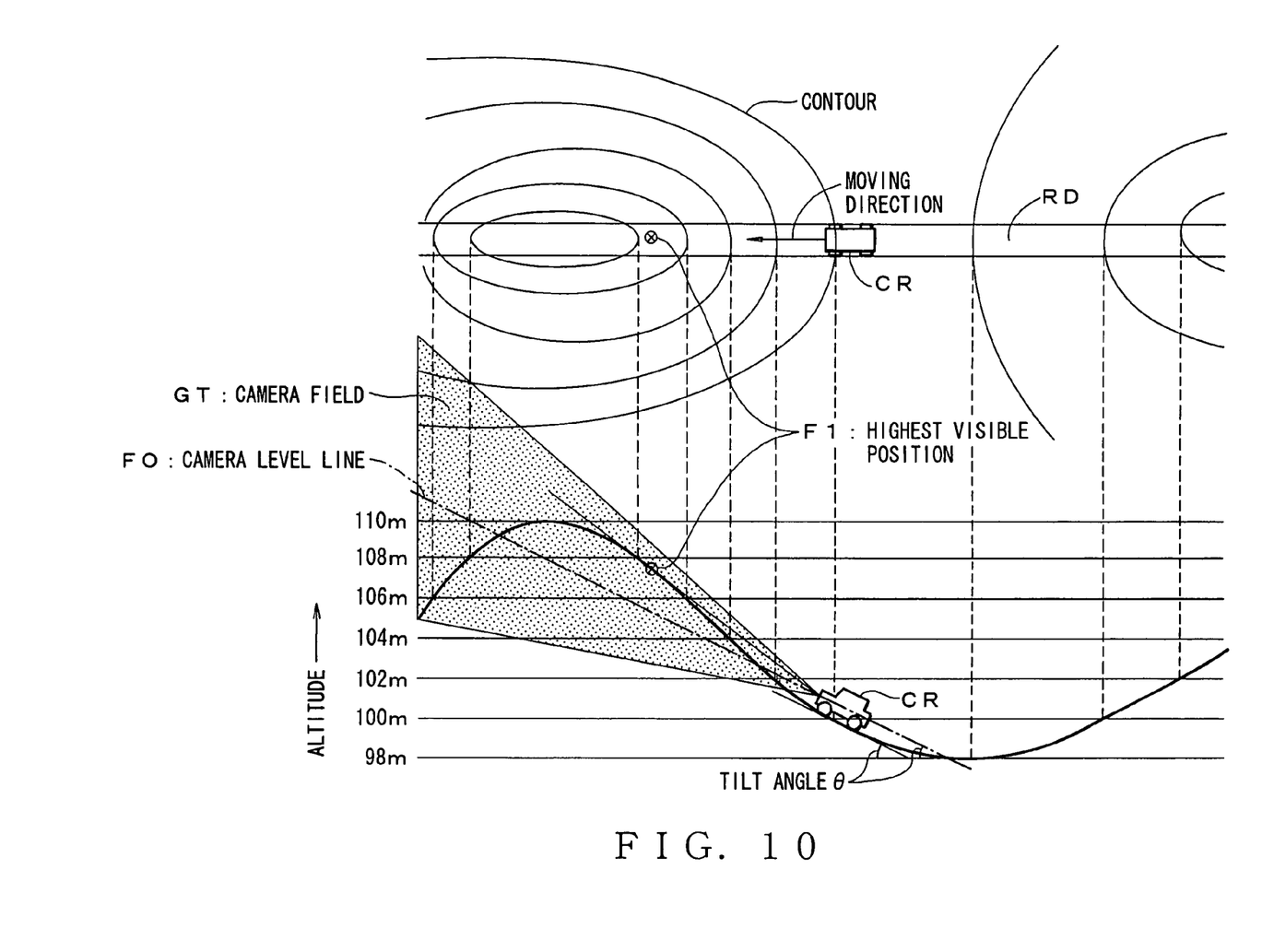
FIG. 10 is a drawing to illustrate a highest visible position on a map data.
Figure 11:
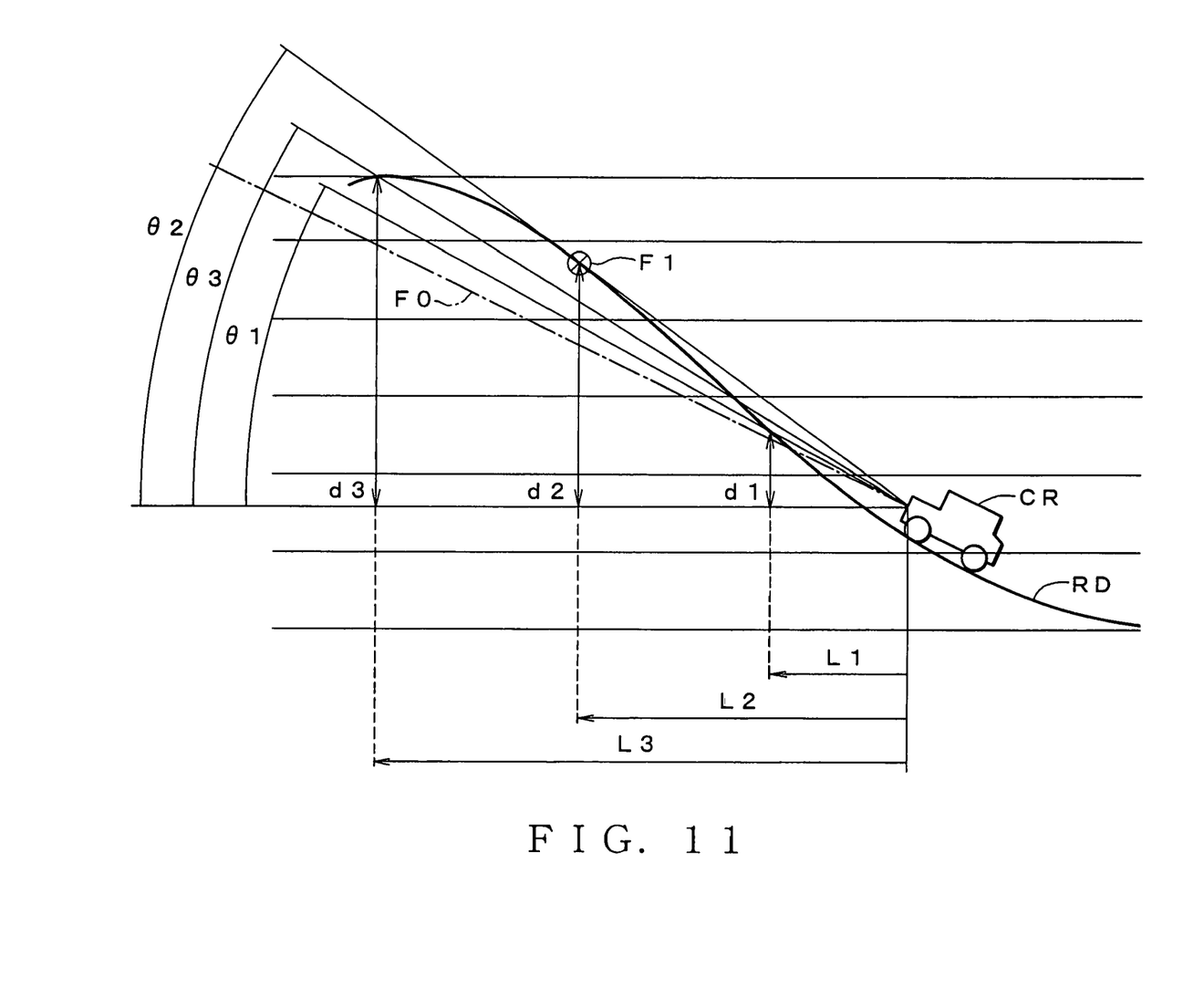
FIG. 11 is a drawing to illustrate how to determine the highest visible position.
Figure 12:
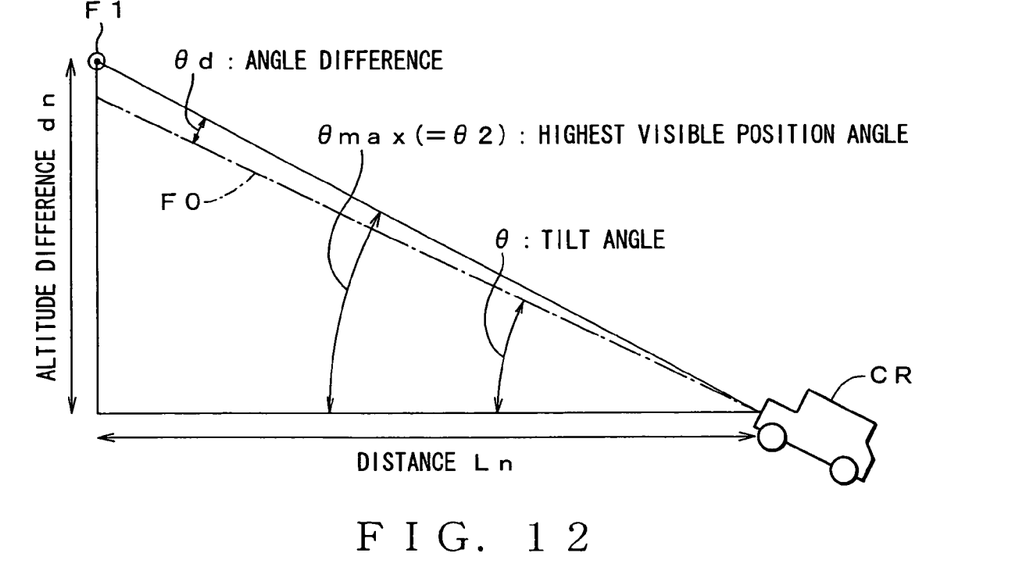
FIG. 12 is a drawing to illustrate how to determine a highest visible position angle and a angle difference.
Figure 13:
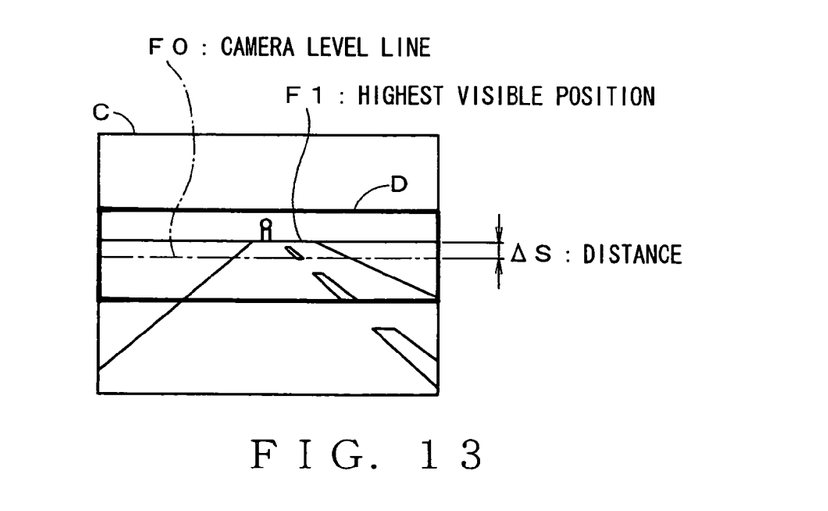
FIG. 13 is a drawing to illustrate a distance for the highest visible position to be moved.

A third embodiment of the present invention is explained by referring to FIGS. 9-14. FIG. 9 is a flow chart showing a processing order of the third embodiment. FIG. 10 is a drawing to illustrate a highest visible position on a map data. FIG. 11 is a drawing to illustrate how to determine the highest visible position. FIG. 12 is a drawing to illustrate how to determine a highest visible position angle and an angle difference. FIG. 13 is a drawing to illustrate a distance for the highest visible position to be moved. FIGS. 14A-14C illustrate a function of the third embodiment.

At step S301 of FIG. 9, the processing device 1 receives an image information of a forward direction of a vehicle. The image information corresponds to a spot information taken by the camera 4. At steps S302 and S303, the processing device 1 receives a position and moving direction of the vehicle CR. The position (latitude and longitude) of the vehicle is determined from GPS signals received by the GPS receiver 7. The moving direction of the vehicle can be determined from a change of latitude and longitude per unit time.

At step S304, the processing device 1 receives a tilt angle $\theta$ of the vehicle as shown in FIG. 10. The tilt angle $\theta$ is the angle between the standard plane (level line) and the moving direction of the vehicle and can be obtained by the tilt sensor 8 such as a gyro or acceleration sensor. The tilt angle $\theta$ is the same as the angle between the standard plane and a camera level line F0 of the camera 4.

At step S305, the processing device 1 receives map data from the memory device 2. The map data include altitude informations at each position. As shown in FIG. 10, the map data provides a plan view (upper portion of FIG. 10) and a sectional view (lower portion) of the related area. In FIG. 10, CR, RD and GT denote the vehicle, the road and a camera field, respectively. The camera field GT depends on a performance of the camera 4 and moves up and down as the tilt angle $\theta$ changes.

At step S306, the processing device 1 calculates the highest visible position F1 as shown in FIG. 10. The highest visible position F1 is defined as the highest position in the camera field GT of the camera 4 attached to the vehicle CR.

FIG. 11 shows an example how to obtain the highest visible position F1. A plurality of sampling points are selected within the camera field GT of the camera 4. The difference of altitude at the each sampling point from the altitude of the vehicle CR is determined, such as d1, d2, d3, as shown in FIG. 11. The example shows only three points. In an actual case, more points are selected. The highest visible position F1 corresponds to the altitude d2.

At step S307, as shown in FIG. 12, the processing device 1 determines a highest visible position angle θmax. An each distance of L1, L2, L3 of the each sampling point from the vehicle CR is determined. θ1, θ2 and θ3 are determined from the measured distances L1, L2, L3 and the altitude differences d1, d2, d3. The highest angle θ2 is the highest visible position angle θmax which is the angle between the highest visible position F1 from the vehicle CR (the camera 4) and the standard plane (level line).

At step S308, as shown in FIG. 12, the processing device 1 determines an angle difference θd. The angle difference θd is the angle between the highest visible position angle θmax and the tilt angle θ. At step S309, as shown in FIG. 13, the processing device 1 determines a distance ΔS in the ordinate from the highest visible position F1 to the camera level line F0 based on the angle difference θd.

At step S310, the processing device 1 moves the display area D by the calculated distance ΔS. The vehicle runs on a flat road RD and it is supposed that the camera level line F0 is positioned at a central portion of the display area D as shown in FIG. 14B. When the vehicle approaches to an uphill road RD, the processing device 1 moves the display area D to a direction of an arrow indicated in FIG. 14A and matches the ordinates of between the highest visible position F1 and camera level line F0. When the vehicle approaches to a downhill road RD, the processing device 1 moves the display area D to a direction of an arrow indicated in FIG. 14C and matches the ordinates of between the highest visible position F1 and camera level line F0. In the embodiment, the image information C is fixed and the display area D is moved, and vice versa. Both can be moved.

At step S311, the processing device 1 displays the image information C inside the display area D to the display device 3. The image displayed at the display device 3 is reversed from the image of the display area D of FIGS. 14A-14C.

According to the third embodiment of the present invention, both the ordinates of the highest visible position F1 and camera level line F0 are matched together on the image information C inside the display area D. The highest visible position F1 is always positioned at the same portion in the display area D. Thereby, when the vehicle runs up-and-down hills, the highest visible position F1 does not move up and down so that a clear view is assured. The camera level line F0 is positioned at a middle portion of the ordinate of the display area D. Then, the display area D is effectively utilized without leaving unavailing areas at the upper and lower portions of the display area D. Thereby, the display device 3 can be smaller. Since the display area D only shows the effective informations so that the clear view is attained.

The display apparatus of the embodiments of the present invention exemplifies the head-up display for night-vision. The present invention is not limited to the embodiments but can be modified to other types of display apparatus displaying the image information of a forward sight.

What is claimed is:

1. A vehicle display apparatus comprising:
a camera to take an image information of a forward direction of a vehicle;
a display device to display the image information to a display area; and
a processing device,
wherein said processing device has the processing steps of:
extracting a current focus of expansion (FOE) from the image information for use by a display control;
matching both ordinates of between the current FOE and a standard FOE to determine a distance for moving the display area, said standard FOE being fixed preliminarily at a predetermined portion of the display area;
moving the display area; and
displaying the image information to the display area.

2. A vehicle display apparatus, comprising
a camera to take an image information of a forward direction of a vehicle;
a display device to display the image information to a display area; and
a processing device,
wherein said processing device has the processing steps of:
extracting a current focus of expansion (FOE) from the image information for use by a display control;
marching both ordinates of between the current FOE and a standard FOE, said standard FOE being fixed preliminarily at a predetermined portion of the display area; and
displaying the image information to the display area;
wherein said processing step of extracting the current FOE has the steps of:
extracting white lines of both sides of a road from the image information;
calculating two straight lines corresponding to the white lines;
calculating the current FOE from a intersection of the two straight lines;
matching both ordinates of between the current FOE and the standard FOE; and
displaying the image information to the display area.

3. The vehicle display apparatus as claimed in claim 2,
wherein said standard FOE is positioned to the display area so a: that a horizon line is displayed at a middle portion of the display area.

4. A vehicle display apparatus comprising:
a camera to take an image information of a forward direction of a vehicle;
a display device to display the image information to a display area;
a near-infrared camera to take reflection spectra of the forward direction of the vehicle; and
a processing device,
wherein said processing device has the processing steps of:
extracting a current horizon line from the reflection spectra for a display control;
matching both ordinates of between the current horizon line and a standard horizon line, said standard horizon line being preliminarily fixed at a predetermined portion of the display area; and
displaying the image information to the display area.

5. The vehicle display apparatus as claimed in claim 4,
wherein said processing step of extracting the current horizon line has the steps of:
extracting the current horizon line from the reflection spectra;

matching both ordinates of between the current horizon line and the standard horizon line; and displaying the image information to the display area.

6. The vehicle display apparatus as claimed in claim 5, wherein said standard horizon line is positioned in a middle portion of the display area.

7. A vehicle display apparatus comprising:

a camera to take an image information in a camera field of a forward direction of a vehicle;

a display device to display the image information to a display area;

a Global Positioning System (GPS) to determine a position and a moving direction of the vehicle;

a tilt sensor to determine a tilt angle between the moving direction and a level line; and a processing device, wherein said processing device has the processing steps of:

extracting map data corresponding to each position of the vehicle from a memory device;

determining a highest visible position in the camera field at a current position of the vehicle from altitudes corresponding to the tilt angle in the map data;

determining a highest visible position angle of between the highest visible position and a standard plane;

matching both ordinates of between the highest visible position in the image information and a camera level line by an angle difference between the highest visible position angle and the tilt angle; and displaying the image information to the display area.

\* \* \* \* \*